Figure 1:
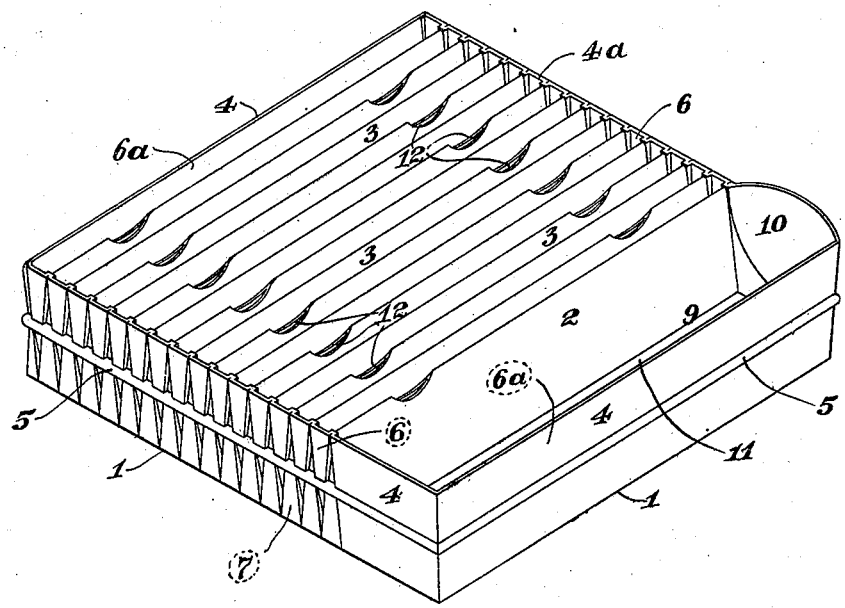

A. J. MEIER.
COMBINED LEAD CORRODING POT AND BUCKLE.
APPLICATION FILED JAN. 22, 1909.

982,285.

Patented Jan. 24, 1911.
5 SHEETS—SHEET 1.

Witnesses:
Edna J. Gockel.
George G. Anderson.

Inventor:
Albert J. Meier,
By Hugh K. Wagner,
His Attorney.

A. J. MEIER.
COMBINED LEAD CORRODING POT AND BUCKLE.
APPLICATION FILED JAN. 22, 1909.

982,285.

Patented Jan. 24, 1911.

5 SHEETS—SHEET 2.

Witnesses
Edna J. Gockel.
George G. Anderson.

Inventor:
Albert J. Meier,
By Hugh K. Wagner
His Attorney.

A. J. MEIER.
COMBINED LEAD CORRODING POT AND BUCKLE.
APPLICATION FILED JAN. 22, 1909.

982,285.

Patented Jan. 24, 1911.
5 SHEETS—SHEET 3.

Witnesses:
Edna J. Gockel.
George G. Anderson.

Inventor:
Albert J. Meier,
By Hugh N. Wagner
His Attorney.

A. J. MEIER.
COMBINED LEAD CORRODING POT AND BUCKLE.
APPLICATION FILED JAN. 22, 1909.

982,285.

Patented Jan. 24, 1911.

5 SHEETS—SHEET 4.

Witnesses:
Edna J. Gockel.
George G. Anderson.

Inventor:
Albert J. Meier,
By Hugh N. Wagner
His Attorney.

THE NORRIS PETERS CO., WASHINGTON, D. C.

A. J. MEIER.
COMBINED LEAD CORRODING POT AND BUCKLE.
APPLICATION FILED JAN. 22, 1909.

982,285.

Patented Jan. 24, 1911.

5 SHEETS—SHEET 5.

Witnesses:
Edna J. Gockel.
George G. Anderson.

Inventor:
Albert J. Meier,
By Hugh K. Wagner
His Attorney.

UNITED STATES PATENT OFFICE.

ALBERT J. MEIER, OF GLENDALE, MISSOURI.

COMBINED LEAD CORRODING-POT AND BUCKLE.

982,285.  Specification of Letters Patent.  Patented Jan. 24, 1911.

Application filed January 22, 1909. Serial No. 473,631.

*To all whom it may concern:*

Be it known that I, ALBERT J. MEIER, a citizen of the United States, residing at Glendale, in the county of St. Louis and State of Missouri, have invented certain new and useful Improvements in Combined Lead Corroding-Pots and Buckles, of which the following is a specification, reference being had therein to the accompanying drawings.

This invention consists in a combined lead corroding pot and buckle and in improvements in connection therewith adapted to accomplish various important economic results.

Until very recently, and in fact until the invention of the present applicant of the lead corroding pot which forms the subject-matter of his Patent No. 906,253, dated December 8, 1908, the almost universal practice among manufacturers of white-lead has been to use vitrified earthenware or glass corroding pots. The existence of such practice has precluded the manufacture of a combined buckle and corroding pot. Even with the introduction of lead corroding pots such as those described in the above-mentioned Patent No. 906,253 it has been thought necessary to continue the use of the old-style buckles in conjunction with the corroding pots of said Patent No. 906,253, and, therefore, heretofore it has been customary to cast or mold buckles by one operation and to cast or mold corroding pots by another and separate operation and thereafter by a third operation to load said buckles in said pots.

One aspect of the present invention is found in the combining of a buckle and a corroding pot in a single piece, same being preferably formed of the same material throughout. In this aspect of the invention the advantage resides in the fact that a single casting operation produces both the buckle and the corroding pot, and locates the former in the latter, thus substituting one operation for the three heretofore necessary, namely, (1) the operation of casting the buckles, (2) the operation of casting the pots, and (3) the operation of loading the buckles in the pots.

Another aspect of the present invention is found in the fact that, whereas in the old-style buckles only forty (40) square inches to the pound of lead of superficial area in each buckle is presented to the corroding action of the chemical treatment by which said buckles are converted into white-lead, by the hereinafter-described manner of making the present combined buckle and pot, such exposed superficial area of the buckle per pound of lead may be increased to one-hundred and fifty (150) square inches or more.

In the old-style method of treating buckles in corroding pots a plurality of buckles (usually about 18) were loaded in each corroding pot. Some of said buckles would be flat and would lie flat against their neighbors, while others would be bent and would leave an air space between same and adjacent buckles. This resulted in very uneven treatment of the buckles by reason of the difference in circulation, the circulation of the gases being greater between bent buckles than between such as lie flat against each other. Consequent upon this, a greater degree or percentage of corrosion of bent buckles would occur than of those which lie flat against each other, although the bent form of the buckle would cause same to take up more room in the corroding pot and reduce the capacity of same. For economy in manufacture it is necessary that the percentage of corrosion shall be as great as possible, and, to that end, that all buckles and all parts of same shall be treated alike. This desirable end is secured by the various forms of buckles herein illustrated and described.

Figure 2:
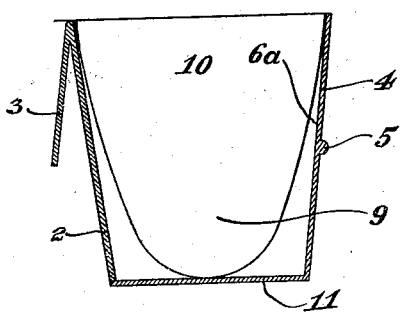
Figure 3:
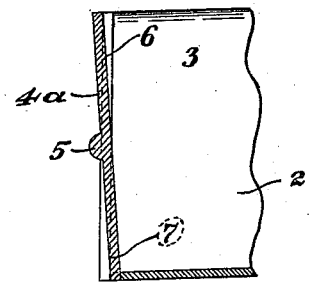
Figure 4:
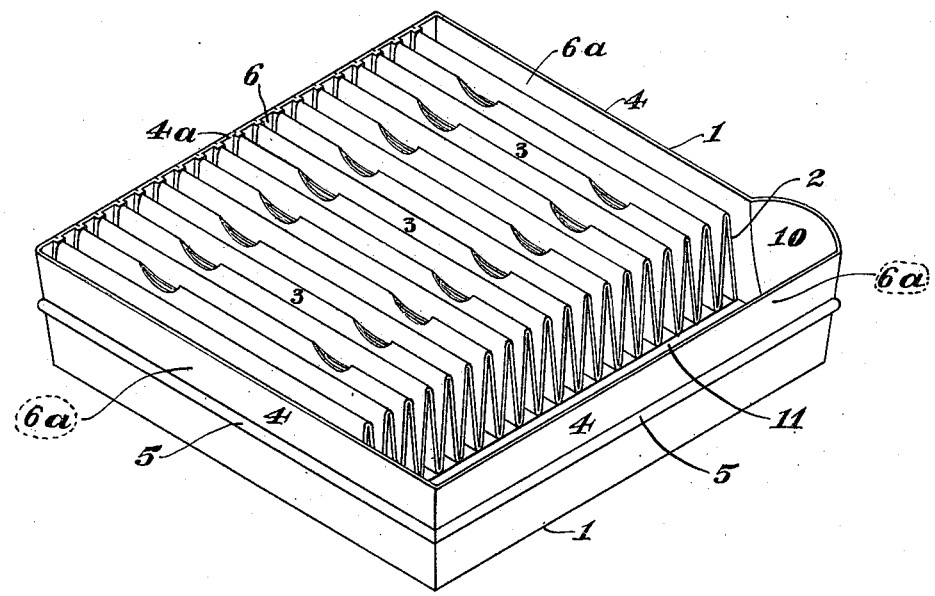
Figure 5:
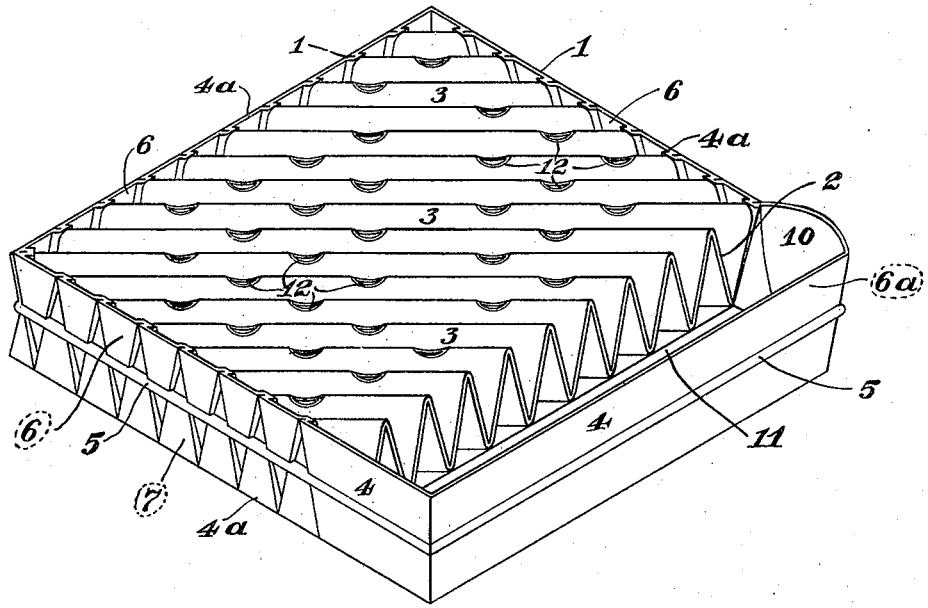
Figure 6:
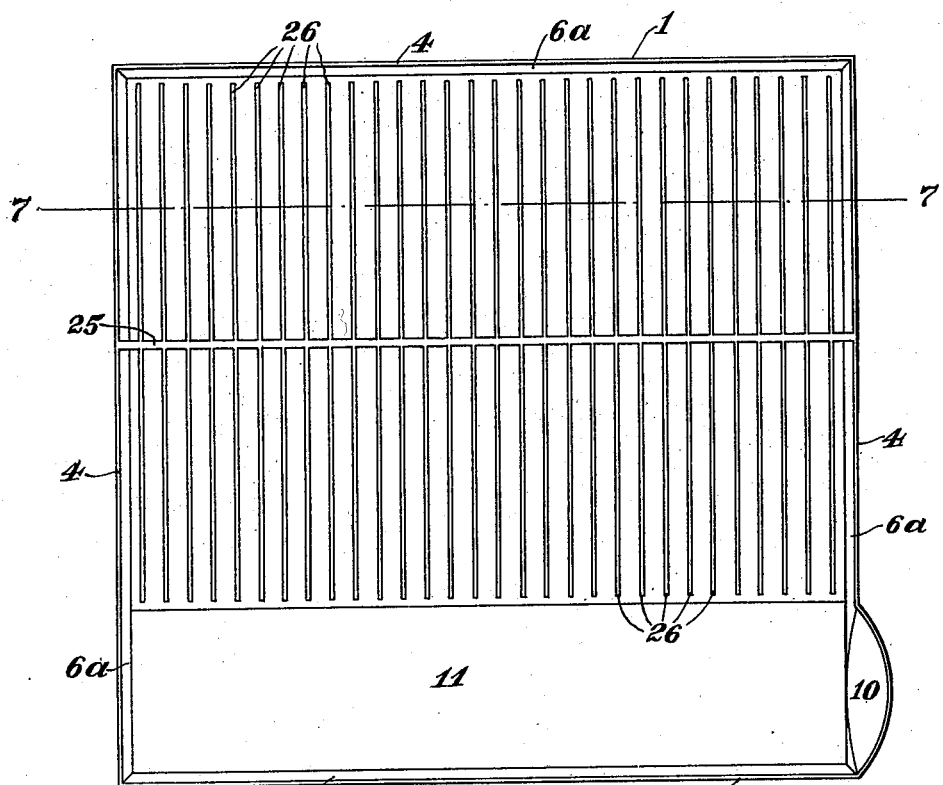
Figure 7:
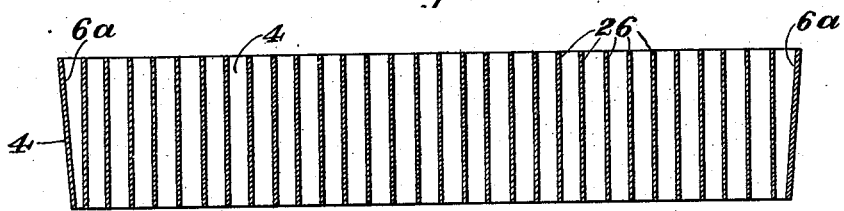
Figure 8:
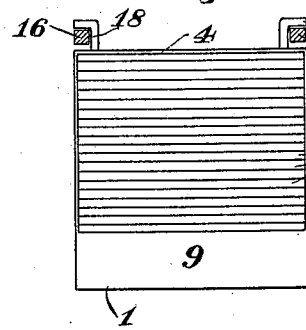
Figure 9:
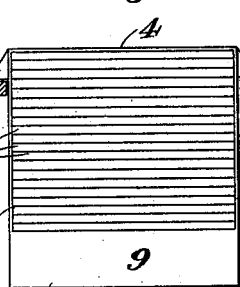
Figure 10:
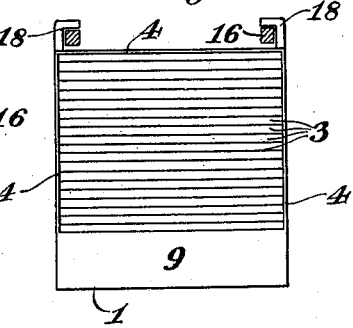
Figure 11:
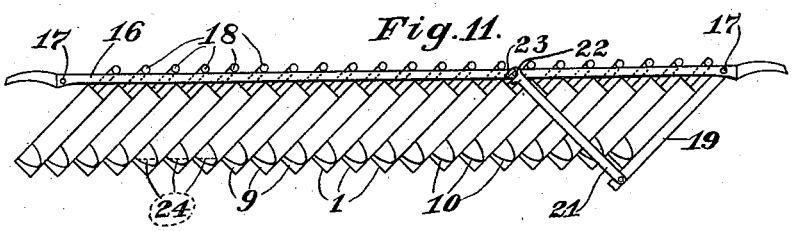
Figure 12:
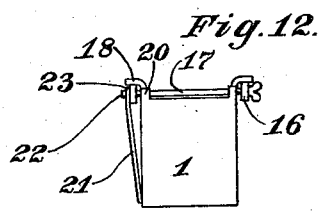
Figure 13:
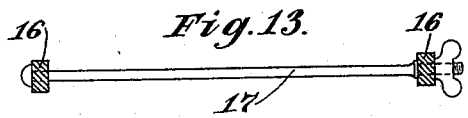
Figure 14:
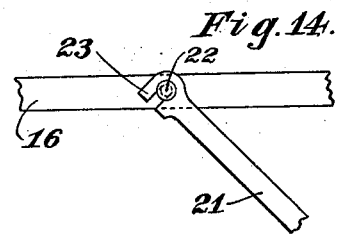

In the accompanying drawings forming part of this specification, like numbers of reference denote like parts wherever they occur, and Figure 1 is a perspective view of the preferred form of this invention, showing the plaits or folds of sheet lead forming the buckle extending parallel to the acid cup; Fig. 2 is a sectional view through said acid cup; Fig. 3 is a sectional view through one of the side walls; Fig. 4 is a perspective view of another advantageous form of this invention, in which said plaits or folds forming the buckle extend at a right angle to the acid cup; Fig. 5 is a perspective view of another desirable form of this invention, in which said plaits or folds forming the buckle extend at an oblique angle to said acid cup; Fig. 6 is a top plan view of another form of this invention, in which fins project from a central spine to form the buckle; Fig. 7 is a sectional view on the line 7—7, Fig. 6; Fig. 8 shows a feature of construction of the device which embodies this invention adapting same to be transported in groups, together with a means for bearing same; Figs. 9 and 10 show two modifications of said means for transportation; Figs. 11 and 12 show the relation of the bearing means to said means for transportation—in other words, how the principal device is to be used; and Figs. 13 and 14 illustrate details of construction of the means for bearing the combined buckles and corroding pots.

From the drawings, it will be observed that various forms may be conveniently and advantageously adopted for the utilization of this invention, one feature of great importance being the formation of the buckle in such manner as to present a large area to the chemical treatment, and an additional feature of great importance being the union of same with the corroding pot in such manner as to be cast at one time. With some sacrifice of the advantages hereinabove described, however, buckles having the increased area to which reference has been made might be loaded in lead corroding pots of the kind herein shown and described.

It will, furthermore, be noticed that in the form illustrated in Fig. 1 a more rigid construction is provided than that obtained in the other forms herein illustrated and described.

The combined buckle and corroding pot consists of the pot 1 and buckle 2. The buckle is preferably formed of a crimped, plaited, or folded sheet of lead, each plait 3 of which forms a reinforcing rib for the corroding pot 1 because attached at each end to opposite walls 4 of the corroding pot 1. A bead 5 surrounds the corroding pot on the exterior thereof and forms an additional reinforcing rib or means for holding the pot 1 in shape. The corroding pot 1 being formed of lead, it will be readily understood that it would easily collapse or bend except for the reinforcement provided by the plaits 3.

In order that the combined pot and buckle may be removed from the mold, the walls 6 and 7 of the pockets formed by the plaited sheet 3 are made to slant outwardly toward the opening of the pockets. As these pockets open alternately on opposite sides of the plait, the complete wall consists of a number of triangular sections each slanting oppositely from the vertical with respect to the adjacent sections.

An acid cup 9 is formed in a part of the corroding pot, same being located between one of the walls 4 and the buckle 2 and by parts of two of the other walls 4. Especially when the pots 1 are tilted in the manner shown in Fig. 11, so as to rest upon the back lower part or corner of each of said pots, said acid cup 9 is adapted to hold acetic acid or other suitable agent for the chemical reaction necessary to corrode the lead of which the buckle is formed, and preferably the pot also. For the introduction of the acid into said cup 9 a mouth 10 is formed by bending outwardly one of the walls 4, this form being preferable so that when a plurality of said pots 1 are arranged in alinement as shown in Fig. 11 a workman with a receptacle having a spout may pour into each mouth 10 a suitable amount of acid, it being impossible to introduce same into cups 9 when the pots 1 are arranged in a row unless some kind of an opening thereinto be left. A mere hole in wall 4 at the point where mouth 10 is located might suffice, but an arrangement like mouth 10 is more convenient.

It will be observed that in the form illustrated in Fig. 1 the first plait is attached throughout its length to the bottom 11 of acid cup 9, while such attachment is possible only at the lower ridge points of plaits 3 in the form shown in Figs. 4 and 5.

In Fig. 6 a reinforcing rib 25 strengthens and makes more rigid opposite walls 4, while fins 26 extending from same as from a central spine expose the necessary surface of lead to secure the high degree of corrosion adapted to produce the greatest amount of white lead at a single treatment, which is the object in view in creating the larger area hereinbefore described of the superficial exposure of the buckles in all the forms herein illustrated and described. No attachment at all of the buckle to said bottom 11 is contemplated as being used in the form shown in Figs. 6 and 7. While each of these forms is useful and advantageous under particular circumstances, yet the form shown in Fig. 1 possesses the especial advantage of making a more rigid unitary article by reason of the long and uninterrupted attachment of first plait 3 to bottom 11. In all the forms plaits 3 are attached to walls 4 and constitute reinforcing means therefor in addition to serving their function of providing an expanded area for the action of the gases necessary in the transformation of the lead buckle into white lead. The openings 12 in plaits 3 may be of any desired number and shape and may be located at any desired point on or about said plaits. Their purpose is to permit and secure freer circulation of the corrosive gases.

In the manner described in my above-mentioned Patent No. 906,253, said combined corroding pots and integral buckles are converted into white lead in a corroding chamber, not shown in the drawings. As a convenient means of carriage of the combined pots and buckles into said corroding chamber, each pot is provided with a lug or lugs 18, preferably in the form shown in Fig. 8, but which may, also, assume the shape and position depicted in Figs. 9 and 10. Bars 16, tied together by rods 17, are inserted under said lugs 18, and said lugs rest thereon, or the support 19 is pivoted at 20 to rod 16, and is held in the position shown in Fig. 11 by tie-rod 21, which latches over pin 22 by means of hook 23. With the support 19 in the position shown in Fig. 11, the corroding pots are held in the position illustrated in the same figure, in which the acid 24 rests, as indicated, in cup 9. There may be either one tie-rod 21 or there may be more tie-rods 21 and accompanying parts, and other means for transporting the combined pots and buckles by means of lugs 18 thereon may be employed.

Having thus described my said invention, what I claim and desire to secure by Letters-Patent is,

1. A combined corroding pot and buckle forming an integral structure comprising a frame, and reinforcements therefor inclosed in the frame, said reinforcements having openings therethrough.

2. A combined corroding pot and buckle forming an integral structure comprising a frame, and reinforcements therefor inclosed in the frame, said reinforcements having openings from the front to the back thereof.

3. A combined corroding pot and buckle forming an integral structure consisting of a frame and a plaited sheet inclosed therein.

4. A combined corroding pot and buckle forming an integral structure comprising a frame, and a member inclosed therein and divided into separate exposure areas.

5. A combined corroding pot and buckle forming an integral structure comprising a frame, and a member inclosed therein and composed of a plurality of parts constituting individual exposure areas.

6. A combined corroding pot and buckle forming an integral structure comprising a frame and an exposure member therein, said frame having a portion thereof adjacent said member constituting an acid pot.

7. A combined corroding pot and buckle forming an integral structure comprising a frame and an exposure member therein, said frame having a portion thereof adjacent said member forming an acid pot and a mouth for the same.

8. A combined corroding pot and buckle forming an integral structure comprising a frame, and a member inclosed therein and divided into a plurality of exposure areas, said frame having a portion thereof adjacent said member constituting an acid pot.

9. A combined corroding pot and buckle forming an integral structure comprising a frame, and a plaited sheet inclosed therein, the plaits of said sheet being formed with circulation openings.

10. A combined corroding pot and buckle comprising a frame, and an exposure member integral therewith and forming a series of pockets the walls of which slant outwardly.

11. A combined corroding pot and buckle comprising a frame, and a plaited sheet inclosed within said frame and connected to the walls thereof, forming pockets whose walls slant outwardly.

12. A combined corroding pot and buckle comprising a frame having the walls thereof reinforced, and a plaited sheet inclosed within said frame and connected to said walls.

13. A combined corroding pot and buckle forming an integral structure consisting of a frame, and a plaited sheet inclosed therein, said frame having a partial bottom to contain acid.

14. A combined corroding pot and buckle of integral construction provided with a lug adapted to be engaged by a carrying member, said lug being formed integral with the said pot and buckle and being itself corrodible.

15. A combined corroding pot and buckle of integral construction comprising a frame and an exposure member inclosed therein, said frame being provided with an integral lug adapted to be engaged by a carrying member, said lug being itself corrodible.

In testimony whereof I have affixed my signature in presence of two witnesses.

ALBERT J. MEIER.

Witnesses:
GLADYS WALTON,
EDNA J. GOCKEL.